US009418354B2

(12) United States Patent
de Assuncao et al.

(10) Patent No.: US 9,418,354 B2
(45) Date of Patent: Aug. 16, 2016

(54) FACILITATING USER INCIDENT REPORTS (71) Applicant: International Business Machines Corporation, Armonk, NY (US)

(72) Inventors: Marcos Dias de Assuncao, São Paulo (BR); Carlos Henrique Cardonha, São Paulo (BR); Fernando Luiz Koch, São Paulo (BR); Marco Aurelio Stelmar Netto, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 310 days.

(21) Appl. No.: 13/851,553

(22) Filed: Mar. 27, 2013

(65) Prior Publication Data
US 2014/0297660 A1 Oct. 2, 2014

(51) Int. Cl.
*G06F 7/00* (2006.01)
*G06F 17/30* (2006.01)
*G06Q 10/10* (2012.01)
*G06Q 50/26* (2012.01)

(52) U.S. Cl.
CPC ............ *G06Q 10/10* (2013.01); *G06F 17/3053* (2013.01); *G06F 17/30528* (2013.01); *G06Q 50/26* (2013.01)

(58) Field of Classification Search
CPC .......... G06F 17/30528; G06F 17/3053; G06F 3/0481; H04N 1/00501; H04N 1/00509; G06Q 50/26
USPC .......................................... 707/732, 733, 752
See application file for complete search history.

(56) References Cited

U.S. PATENT DOCUMENTS

| 5,910,799 A | 6/1999 | Carpenter |
| 6,567,104 B1 | 5/2003 | Andrew |
| 6,874,127 B2 | 3/2005 | Newell |
| 7,512,889 B2 | 3/2009 | Newell |
| 8,024,330 B1* | 9/2011 | Franco .................... G06F 17/30 707/724 |
| 8,825,644 B1* | 9/2014 | Crichton et al. ............. 707/732 |
| 2003/0171870 A1* | 9/2003 | Gueziec ....................... 701/202 |

(Continued)

OTHER PUBLICATIONS

Banerjee et al, 'What Affects Me?' A Smart Public Alert System based on Stream Reasoning, Proceedings of ICUIMC (IMCOM) '13, Jan. 17-19, 2013, Kota Kinabalu, Malaysia; pp. 10.*

(Continued)

*Primary Examiner* — Marc Somers
(74) *Attorney, Agent, or Firm* — Louis J. Percello; Otterstedt, Ellenbogen & Kammer, LLP (57) ABSTRACT

With a computer processor, access is obtained to a sorted global tuple list of incident types, each tuple of which includes at least an incident identifier, a corresponding incident type, a corresponding context, and a corresponding impact factor. The latter specifies importance of solving the corresponding incident type in the corresponding context. Each tuple of the global tuple list is sorted by decreasing order of impact factor. At the computer processor, context information is obtained for at least one remote computing device; based on the context information and the sorted global tuple list, the computer processor sends, over a telecommunications infrastructure, data which causes an incident reporting display on the remote computing device to be re-ordered in accordance with the impact factors as they are ranked in accordance with the context information for the at least one remote computing device.

16 Claims, 6 Drawing Sheets

(56) References Cited

U.S. PATENT DOCUMENTS

| | | | |
|---|---|---|---|
| 2004/0153693 A1* | 8/2004 | Fisher et al. | 714/4 |
| 2005/0017954 A1* | 1/2005 | Kay | G06F 3/0233 345/169 |
| 2007/0300185 A1 | 12/2007 | Macbeth | |
| 2009/0055739 A1 | 2/2009 | Murillo | |
| 2009/0276705 A1* | 11/2009 | Ozdemir et al. | 715/708 |
| 2010/0332131 A1* | 12/2010 | Horvitz et al. | 701/210 |
| 2014/0067800 A1* | 3/2014 | Sharma | 707/736 |

OTHER PUBLICATIONS

Oku, et al. "A Ranking Method based on Users' Contexts for Information Recommendation". Proceeding ICUIMC '08 Proceedings of the 2nd international conference on Ubiquitous information management and communication, pp. 289-295, 2008.

Vanderdonckt et al. "A Design Space for Context-Sensitive User Interfaces", IASSE 2005: 207-214.

Xiang, et al . "Context-Aware Ranking in Web Search". SIGIR'10, Jul. 19-23, 2010, Geneva, Switzerland, pp. 1-8.

Limbourg et al. "USIXML: A User Interface Description Language for Context-Sensitive User Interfaces". Proceedings of the ACM AVI'2004, Workshop Developing User Interfaces with XML: Advances on User Interface Description Languages, 2004, pp. 1-8.

Hendrik Witt, "A Toolkit for Context-aware User Interface Development for Wearable Computers". 5th International Symposium on Wearable Computers (ISWC 2001), Oct. 8-9, 2001, pp. 1-3.

* cited by examiner

|        | Without Technique (ms) | With Technique (ms) | Improvement (%) |
|--------|------------------------|---------------------|-----------------|
| User 1 | 5410 | 2510 | 53.6% |
| User 2 | 4210 | 2320 | 44.9% |
| User 3 | 4110 | 2410 | 41.4% |
| User 4 | 5010 | 2800 | 44.1% |
| User 5 | 4470 | 2610 | 41.6% |
| User 6 | 4290 | 2480 | 42.2% |
| User 7 | 5620 | 2410 | 57.1% |
| User 8 | 3990 | 2510 | 37.1% |
| User 9 | 5210 | 2790 | 46.4% |
| User 10 | 4860 | 2810 | 42.2% |
| AVERAGE | 4718 | 2565 | 45.6% |

*FIG. 3*

|        | Without Technique (ms) | With Technique (ms) | Improvement (%) |
|--------|------------------------|---------------------|-----------------|
| User 1 | 5250 | 2420 | 53.9% |
| User 2 | 5020 | 2350 | 53.2% |
| User 3 | 5340 | 2380 | 55.4% |
| User 4 | 5460 | 2540 | 53.5% |
| User 5 | 5230 | 2530 | 51.6% |
| User 6 | 5520 | 2460 | 55.4% |
| User 7 | 6300 | 2510 | 60.2% |
| User 8 | 5300 | 2490 | 53.0% |
| User 9 | 4830 | 2820 | 41.6% |
| User 10 | 4810 | 2890 | 39.9% |
| AVERAGE | 5306 | 2539 | 52.1% |

FACILITATING USER INCIDENT REPORTS

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to citizen sensing platforms and the like.

BACKGROUND OF THE INVENTION

A Citizen Sensor Platform (CSP) is an emerging paradigm in social computing research, defined as a network of interconnected participatory citizens who provide observations or reports about events happening in a city. The objective is to instrument citizens and cities, interconnect parties, analyze related events, and provide recommendation and feedback reports.

SUMMARY OF THE INVENTION

Principles of the invention provide techniques for facilitating user incident reports. In one aspect, an exemplary method includes the step of obtaining, with a computer processor, access to a sorted global tuple list of incident types. Each tuple of the global tuple list includes at least an incident identifier, a corresponding incident type, a corresponding context, and a corresponding impact factor. The corresponding impact factor specifies importance of solving the corresponding incident type in the corresponding context. Each tuple of the global tuple list is sorted by decreasing order of the impact factor. Further steps include obtaining, at the computer processor, context information for at least one remote computing device; and, based on the context information for the at least one remote computing device and the sorted global tuple list, sending, with the computer processor, over a telecommunications infrastructure, data which causes an incident reporting display on the remote computing device to be re-ordered in accordance with the impact factors as they are ranked in accordance with the context information for the at least one remote computing device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide faster incident reporting times to allow authorities to more quickly respond to emergencies.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

One or more embodiments provide a system and method that manages user interfaces in Citizen Sensor Monitors (CSM) applications, which are part of a Citizen Sensing Platform (CSP). More particularly, one or more embodiments provide an engine that generates ranking lists of incidents based on a combination of local context information (e.g. user's location, current time, events, objects present, cultural context, and the like), in combination with user profile, and a calculation of impact factor of related incidents (that is, a context-variant value that indicates the level of priority of the incidents). Advantageously, one or more embodiments provide the best-fit reporting interface for a CSM; that is, for instance, order the list of items to be displayed in the Citizen Sensing Reports (CSR) in a sequence that is probably most adequate considering the immediate interest of the end-users.

As noted, a Citizen Sensor Platform (CSP) is an emerging paradigm in social computing research, defined as a network of interconnected participatory citizens who provide observations or reports about events happening in a city. The objective is to instrument citizens and cities, interconnect parties, analyze related events, and provide recommendation and feedback reports. One or more embodiments enhance the ability of citizen volunteers to provide such reports, by dynamically updating the user interface(s) of reporting tool(s) on mobile computing device(s) used by such citizen volunteers.

CSM applications are software solutions deployed on end-user's mobile computing devices that allow them to report situations on the spot. These reports generate Citizen Sensor Events (CSE) that mark situations such as security threats, the occurrence of potholes, pollution in creeks, traffic jams, problem in public illumination, and the like. CSR are the combination of end-users' entered annotations with automated sensed information. These reports are transmitted to a remote server where the data is stored, indexed, and grouped. This information is used for running analysis and generating reports.

One or more embodiments advantageously take into account the result of the activities from the users (and a ranking of such results) in order to change the user interface. Furthermore, one or more embodiments take into account environmental information, a user profile and/or a ranking of the topics to be reported (or the items to be displayed) in order to decide about adaptations in the interface.

In one or more embodiments, the user interface of the user who reports incidents is adapted based on the impact of such incidents, weather, location, and/or time. One exemplary benefit of this solution is that users are able to find the type of incident more quickly in the user interface, which is particularly important for emergency incidents.

Figure 4:
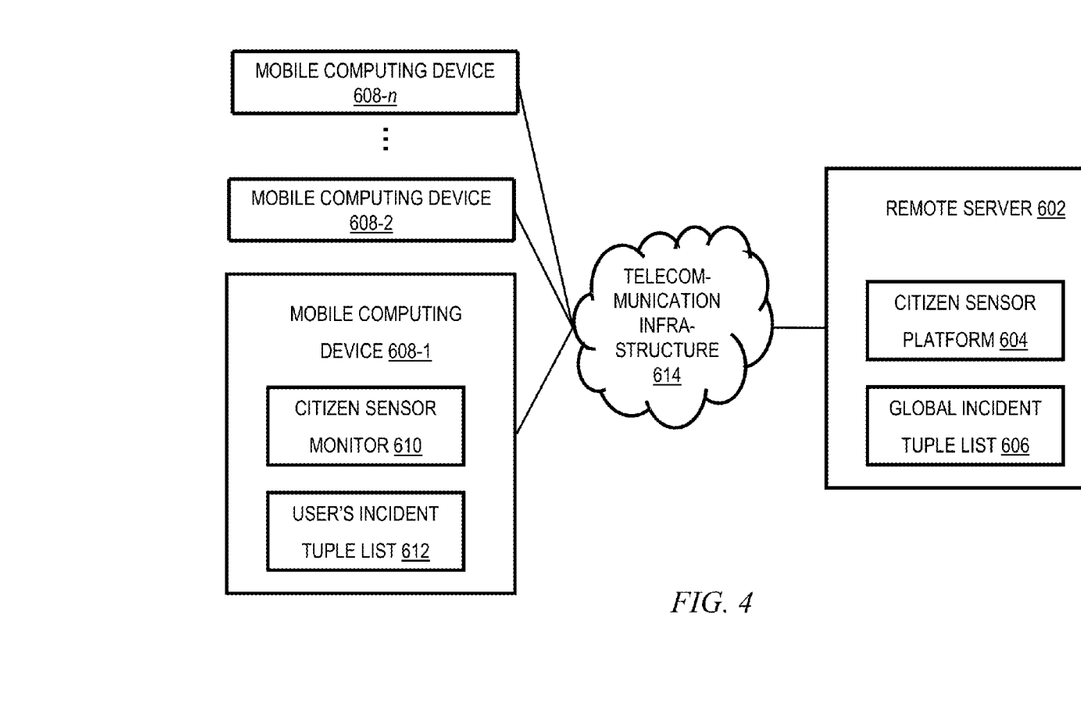
FIG. 4 shows an exemplary system block diagram, in accordance with an aspect of the invention.

One or more embodiments provide a system and method that maintains and/or ranks lists of incidents or reporting items and displays them on a user interface provided for the client application of a Citizen Sensing Platform. Referring to FIG. 4, a system in accordance with an exemplary embodiment includes a user interface provided for the client application of a Citizen Sensing Platform. The exemplary system includes one or more Mobile Computing Devices (MC) 608-1 through 608-n, such as smartphones or tablet computing devices used by end-users ("608" refers generally to any such MC). Citizen Sensor Monitor (CSM) applications 610, running on the MCs, provide the interface to allow end-users to report Citizen Sensor Events (CSE), which mark situations such as security threats, the occurrence of potholes, pollution in creeks, traffic jams, problems in public illumination, and the like. The application 610 creates Citizen Sensing Reports (CSR) by combining CSE with automated sensed information.

The exemplary system also includes a Remote Server (RS) 602 running back-end services related to the Citizen Sensor Platform (CSP) 604. The exemplary system still further includes a Telecommunication Infrastructure (T) 614, as for example WiFi, 3G, 4G networks or any other form of wireless communication that allows for data communication between applications running on MCs 608-1 through 608-n and RS 602.

CSP 604 provides a set of services to provide a communication interface, processing methods, data repository, Analytics methods, and displaying methods as the back-end services for CSE generated through CSM 610.

An exemplary method includes the User entering Citizen Sensor Events (CSE) by classifying events on-the-spot (e.g. reports about broken lights, road potholes, and the like), using one of the CSM applications 610, running on one of the MC 608. The CSM augments the CSE with contextual information (e.g. location, user profile, sensor data, and the like), thereby generating a CSR. The CSM packs the CSR in communication packets, forming the data package d', and transmits d' to the CSP 604, running on RS 602, through the Telecommunication Infrastructure 614. The CSP 904 implements a set of data interface modules MI that receive data packets d', unpack the elements generating the data structures (tuples) t' including, for example:

<userID, incidentID, incidentType, time, location, weather>, where:
userID identifies the user,
incidentID is the id (identifier) of the incident,
incidentType is the type of incident (e.g. car accident, flooding, incident requiring police response, or the like),
time indicates when the incident occurred, and
location indicates the place where the incident took place.

The skilled artisan, given the teachings herein, will be able to implement the modules MI using a variety of techniques; a non-limiting example of a suitable technique is a webserver.

The CSP 604 implements a set of data processing modules MP to process t' by pre-processing, storing, and classifying the information, storing the raw and processed information into Data Repositories (DR), storing t' as part of the set of tuples T. The skilled artisan, given the teachings herein, will be able to implement the modules MP using a variety of techniques. The pre-processing step depends on the type of analysis that is to be conducted. For example, potentially incorrect reports can be removed from the database by filtering out those that are clearly redundant (e.g., two reports submitted by the same user in a very short period of time containing exactly the same information) and those containing clearly wrong measurements (e.g., reports associated with geographical coordinates located in the middle of the ocean). Storing modules depend on the particular embodiment. Classification criteria depend on the particular embodiment as well. By way of a non-limiting example, reports can be classified according to the frequency with which similar ones have been made, and this is a task that can be accomplished with a simple cross-relation of reports of same type associated to a certain restricted area during a certain period of time. More advanced embodiments may consider weighted reports, where these weights stem, e.g., from users' reputations. The modules MP can thus be implemented, in one or more embodiments, as part of a system with a database.

The CSP 604 implements a module referred to as MR, in accordance with an embodiment of the invention, which provides a technique to process data from DR, generating a ranking list RL including the elements <order, eventType> in response an inbounding request, implementing the following steps:

There is a table TI of pre-classified impact factors related to eventType, including the entries <time, location, eventType, impactFactor>

There is a table TW of pre-classified profile factors for eventTypes related to eventType and userID, including the entries <eventType, userID, weight>

The module is invoked with parameters <time, location, userID>

There is a technique to lookup for impact factors for nearby events based on given time and location, and returning a list L including the entries <eventType, impactFactor>

There is a technique to lookup for weight factors in TW, for each element in L, generating a list L' containing the elements <eventType, impactFactor, userID, weight>

There is a technique to generate a ranked list RL containing elements <order, eventType> based on the following calculation:

Generation of Ranked List RL

Let $w_e$ denote the weight of event e for the user and $i_{e,t,l}$ denote the impact of event e at the current time t and location l. More precisely, assume vectors w and i are in $R_+^{|E|}$, where E denotes the set of event types. Initially, the technique computes the contextual weight of each event e, which is denoted as $c_e$. The technique makes a simple normalization of the vectors i and w; that is, it computes vectors i' and w' such that:

$$i_e' = i_e/(\Sigma_{e'} i_{e'})$$

and $$w_e' = w_e/(\Sigma_{e'} w_{e'}).$$

Vector C is such that $c_e = (w'i'^T)e$.

That is, the e-th coordinate of vector C is equal to the element of matrix $w'i'^T$ at line e and column e.

Once vector C has been computed, the list of event Types is sorted in descending order. An order number is assigned to each event type according to the results of this sorting procedure (the element with highest contextual weight will be the first to appear on the list).

Now continuing with the exemplary method steps:

The module returns RL contains elements <order, eventType>

CSM 610, running on MC 608, requests RL passing the parameters time, location, and userID;

CSP 604 receives the request and submits to MR (see above), returning RL containing elements <order, eventType>;

CSM 610 applies RL to adjust the order of elements in the display of CSM (see discussion of FIGS. 2-5).

With continued reference to FIG. 4, and by way of review and provision of additional detail, Mobile Computing Device (MC) 608 includes one or more suitable mobile computing devices such as smartphone or tablet computing device used by end-users. Citizen Sensor Monitors (CSM) applications 610, running on MC, provide the interface to allow end-users to report Citizen Sensor Events (CSE) that mark situations such as security threats, the occurrence of potholes, pollution in creeks, traffic jams, problem in public illumination, and the like. The applications 610 prepare Citizen Sensing Reports (CSR) by combining CSE with automated sensed information.

Remote Server (RS) 602 runs back-end services related to Citizen Sensor Platform (CSP) 604. Telecommunication Infrastructure (T) 614, as for example WiFi, 3G, 4G networks or any other form of wireless communication, allows for data communication between applications running on MC and RS.

Citizen Sensor Platform (CSP) 604 includes a set of services to provide, for example, communication interface, processing methods, data repository, analytics methods, and displaying methods as the back-end services for CSE generated through CSM 610. User's Incident Tuple List 612, on the user side, contains the list of incident types presented to the user through his or her device. Global Incident Tuple List 606, on the server side, contains the list of incident types and their respective impact factors according to time, location, and weather. The impact factor determines the importance of solving an incident type at a given time, location, weather, and so on.

Figure 1:
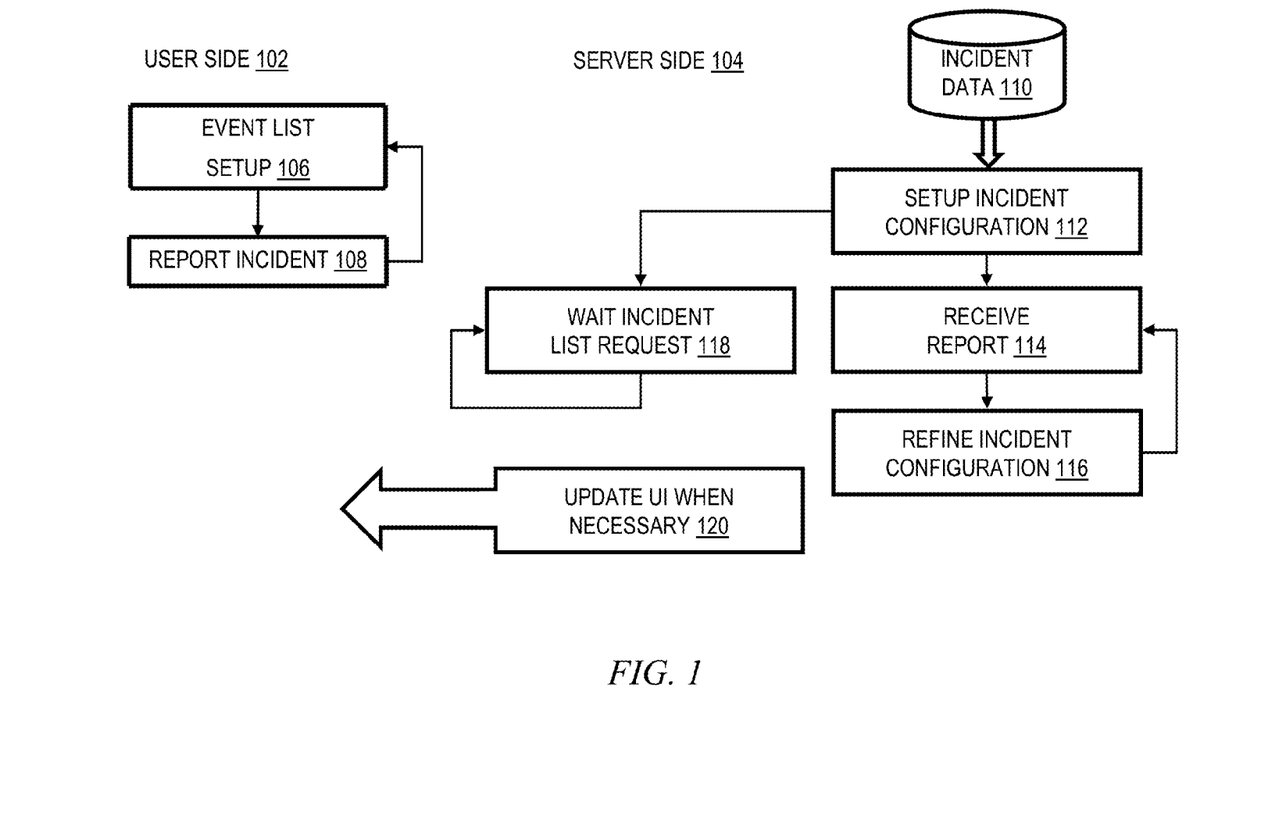
FIG. 1 shows a flow chart, in accordance with an aspect of the invention.

Referring now to the flow chart of FIG. 1, on user side 102, in event list setup 106, receive updated list and/or order of the incidents when the application running on the user device responsible for reporting the incidents starts and/or at predetermined time intervals. In report incident step 108, the user device reports the incident to the server 602. The monitor 610 select the incident type, adds optional details to the incident, and submits the incident report.

On server side 104, in setup incident configuration step 112, receive a global tuple list 606 of the incident types from an external source 110. Each database tuple of this list includes:

<incidentID, incidentType, impact factor, time, location, weather>, where:

incidentID is the id of the incident, and impact factor is a number that classifies how important is to solve the incident type at a given time, location, and weather.

Still in step 112, sort tuples by the decreasing order of their impact factor.

In step 118, wait incident list request, wait for a user to request and/or update the incident type list, and send the list to the user.

In step 114, receive report, wait for a user reporting an incident. Receive from the user: current time, location, and incidentID (weather information is obtained from an external source in one or more embodiments).

In step 116, refine incident configuration, obtain the rank of the incidentType inside the list of incident types presented to the user, and update user incident tuple list for that time, location, and weather in the server database of server 602. Then, update the list 612 in the user device 608, as seen at 120, when necessary.

One or more embodiments are useful in a variety of contexts. One or more embodiments are believed to be particularly pertinent in the context of users reporting incidents urgently. In this regard, currently, users may take a long time to go through a list of possible incidents (e.g. flooding, incidents requiring police attention, car accidents, brush fires, and the like). Emergency situations typically require fast reporting actions. One or more embodiments advantageously provide a system and method to adapt the user interface (e.g., of a remote device 608) according to incident impact, weather, location, and/or time. One or more embodiments advantageously provide a ranking method and user interface adaptation based on the impact factor of solving an incident at a given time, location, and weather.

Figure 2:
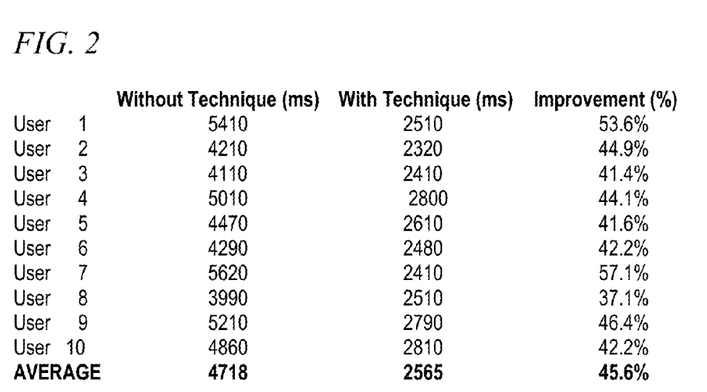
FIG. 2 shows a non-limiting exemplary comparative analysis of improvement in reaction times with a method of context-aware prioritization of report options, for a list of options where no scrolling is needed, for an exemplary flooding incident reporting scenario, and simulated screen shots without and with prioritization, in accordance with an aspect of the invention.
Figure 3:
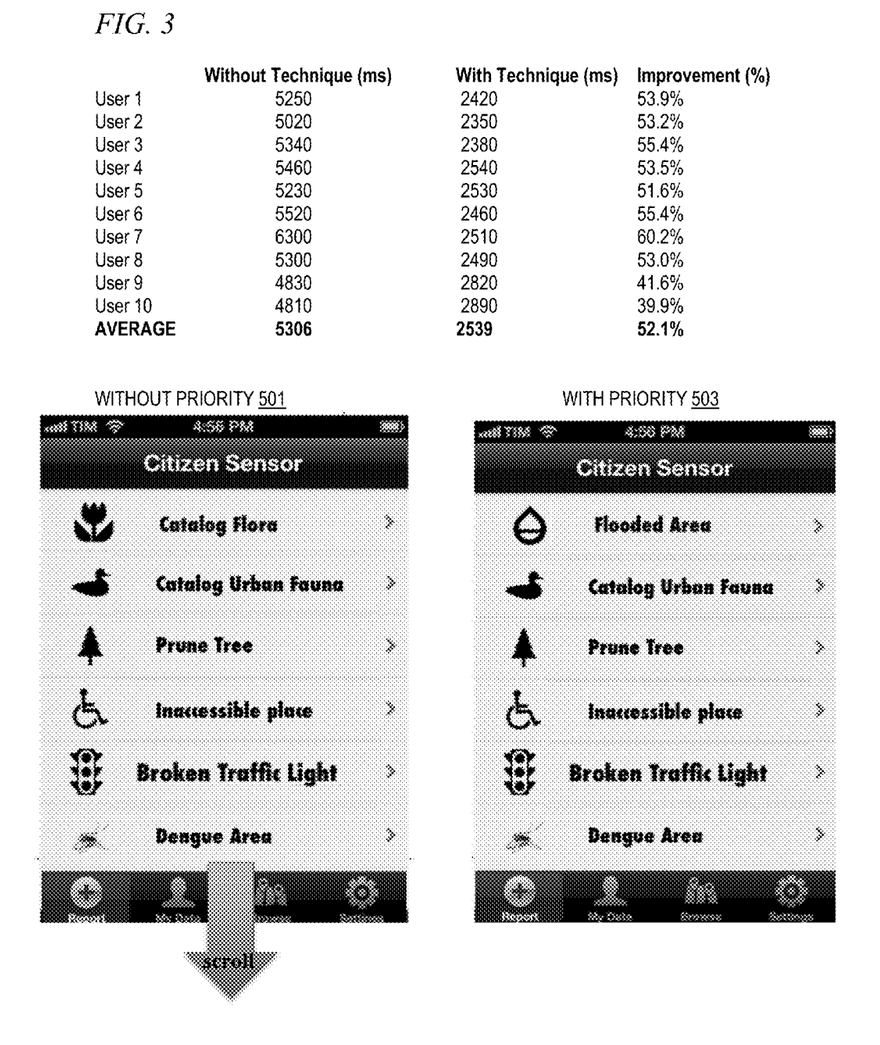
FIG. 3 shows a non-limiting exemplary comparative analysis of improvement in reaction times with a method of context-aware prioritization of report options, for a list of options when scrolling is needed, for an exemplary flooding incident reporting scenario, and simulated screen shots without and with prioritization, in accordance with an aspect of the invention.

FIG. 2 shows a non-limiting exemplary comparative analysis of improvement in reaction times with a method of context-aware prioritization of report options, for a list of options wherein scrolling is not required, for an exemplary flooding incident reporting scenario, and simulated screen shots without and with prioritization, in accordance with an aspect of the invention. FIG. 3 shows a non-limiting exemplary comparative analysis of improvement in reaction times with a method of context-aware prioritization of report options, for a list of options wherein scrolling is required, for an exemplary flooding incident reporting scenario, and simulated screen shots without and with prioritization, in accordance with an aspect of the invention.

In FIGS. 2-3, the methodology was as follows. The context was defined from a list of possible contexts based on absolute counting of citizen reports. The target option was located at the middle of the list for the interface without the proposed technique, while the target option was at the top of the list for the interface using a technique in accordance with an aspect of the invention. The reaction time is the average of ten executions per user per method.

FIG. 2 was for a first scenario where no scrolling is necessary, since all options can be seen on the screen. The first column of data shows the reaction time for cases not using embodiments of the invention, while the second column of data shows the reaction time note in using an embodiment of the invention. The final data column shows the percentage improvement.

View 401 shows the screen without prioritization. The choices are "catalog flora," "catalog urban fauna," "prune tree," "inaccessible place," "flooded area," "dengue area," and "broken traffic light." View 403 shows the screen with prioritization. The choices are the same, and all are visible on the screen, but they have been re-ordered to put "flooded area" at the top as likely most important to this particular user based on the context.

FIG. 3 was for a second scenario where scrolling is necessary, since the reporting option cannot be seen on the initial screen when the user opens the incident reporting application scrolling list of options; i.e., the report options do not fit on the screen. By way of further clarification, the option appearing on the middle of the menu can only be visualized and selected by the user if the screen is scrolled down, i.e., the user should press the screen and push it down in order to see this reporting option.

View 501 shows the screen without prioritization. The choices are "catalog flora," "catalog urban fauna," "prune tree," "inaccessible place," "broken traffic light," and "dengue area." The desired choice, "flooded area," is not visible without scrolling; the necessity for scrolling is indicated by the arrow labeled "scroll." View 503 shows the screen with prioritization. The choices are different; "catalog flora" has been removed to put "flooded area" at the top as likely most important to this particular user based on the context.

Other exemplary applications could have different percentages of improvement; the values depicted are non-limiting and merely to illustrate to the skilled artisan what can be attained in some cases.

Figure 5:
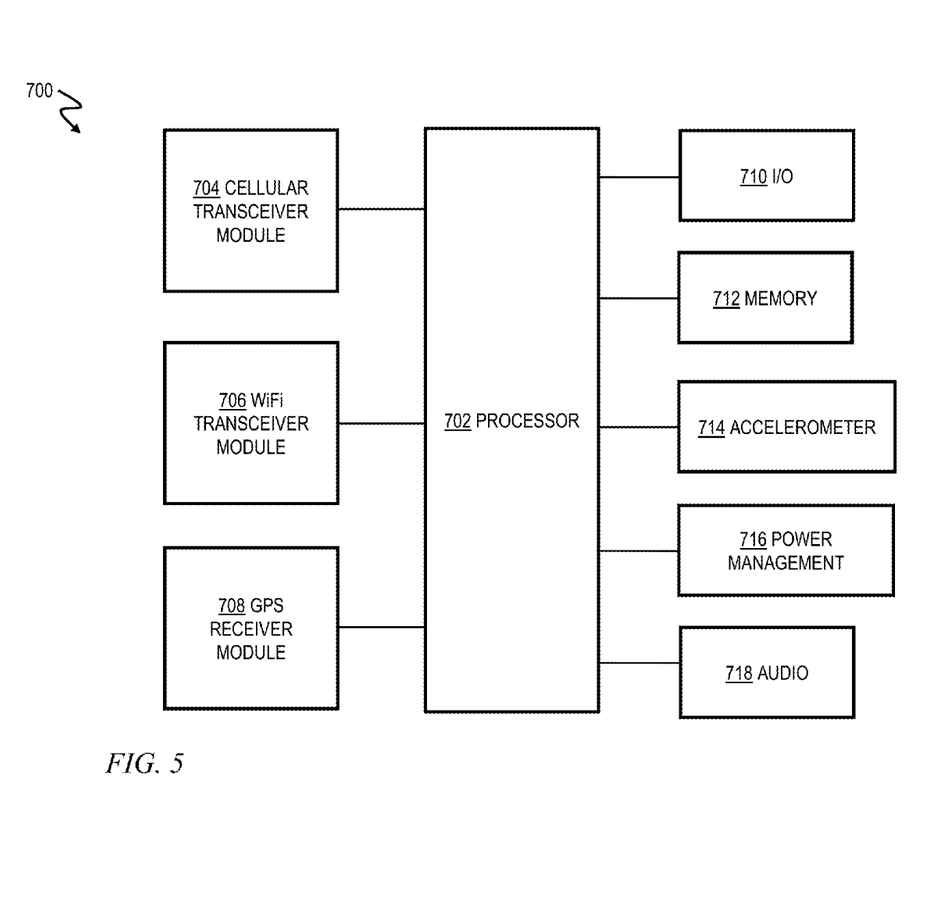
FIG. 5 is a block diagram of a cellular telephone implementing one or more aspects of the invention.

FIG. 5 is a block diagram of an exemplary smart phone 700 implementing an embodiment of the invention, and is also generally indicative of a tablet computing device or the like. Phone 700 includes a suitable processor; e.g., a microprocessor 702. A cellular transceiver module 704 coupled to processor 702 includes an antenna and appropriate circuitry to send and receive cellular telephone signals. A WiFi transceiver module 706 coupled to processor 702 includes an antenna and appropriate circuitry to allow phone 700 to connect to the Internet via a wireless network access point or hotspot. The skilled artisan will appreciate that "Wi-Fi" is a trademark of the Wi-Fi Alliance and the brand name for products using the IEEE 802.11 family of standards. A GPS receiver module 708 coupled to processor 702 includes an antenna and appropriate circuitry to allow phone 700 to calculate its position by precisely timing the signals sent by GPS satellites high above the Earth.

One or more implementations of the invention use software (e.g., 610) in memory 712 which when loaded into RAM causes the processor 702 to implement the logic described herein.

Input-output (I/O) block 710 coupled to processor 702 is indicative of a variety devices such as a touch screen, keypad, a display, and so on. Memory 712 is coupled to processor 702. Accelerometer 714 coupled to processor 702 detects acceleration of phone 700. Audio module 718 coupled to processor 702 includes, for example, an audio coder/decoder (codec), speaker, headphone jack, microphone, and so on. Optionally, a command system for responding to voice commands via automatic speech recognition can be provided. Power management system 716 can include a battery charger, an interface to a battery, and so on.

Figure 6:
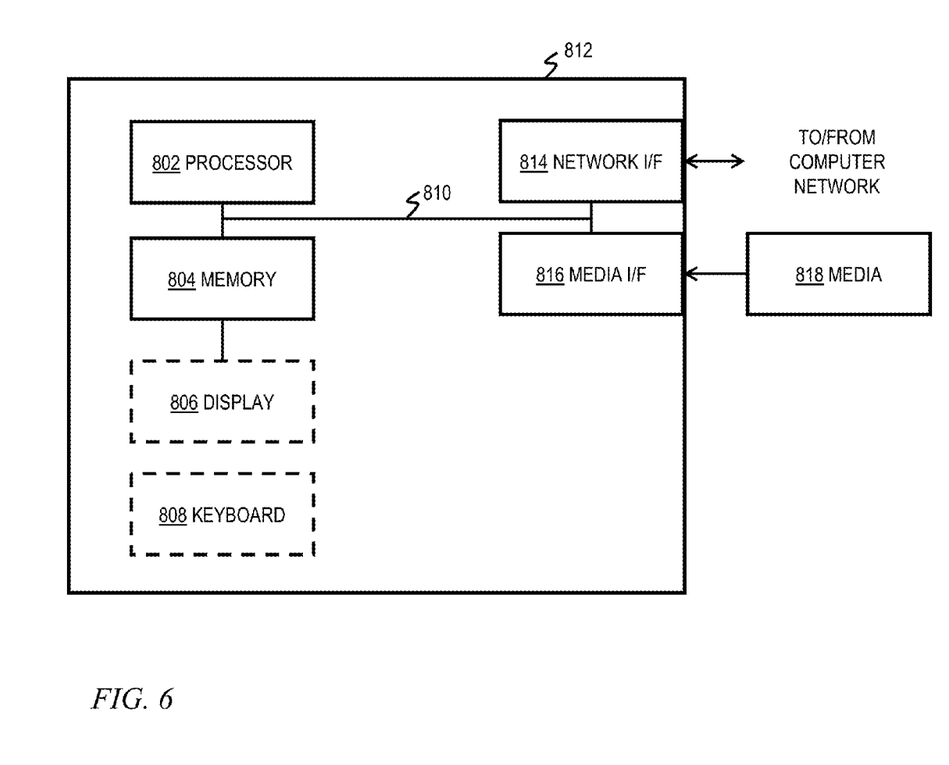
FIG. 6 depicts a computer system that may be useful in implementing one or more aspects and/or elements of the invention.

Given the discussion thus far, it will be appreciated that, in general terms, an exemplary method, according to an aspect of the invention, includes the step of obtaining, with a computer processor 802, access to a sorted global tuple list 606 of incident types. Each tuple of the global tuple list includes at least an incident identifier, a corresponding incident type, a corresponding context, and a corresponding impact factor. The corresponding impact factor specifies the importance of solving the corresponding incident type in the corresponding context. Each tuple of the global tuple list is sorted by decreasing order of the impact factor. A further step includes obtaining, at the computer processor, context information for at least one remote computing device 608. A still further step includes, based on the context information for the at least one remote computing device and the sorted global tuple list, sending, with the computer processor, over a telecommunications infrastructure 614, data which causes an incident reporting display on the remote computing device to be re-ordered in accordance with the impact factors as they are ranked in accordance with the context information for the at least one remote computing device.

In at least some instances, the three steps mentioned in the preceding paragraph are implemented via basic data retrieval operations conducted by an application, such as a web server, that has direct access to the databases (e.g., 606) containing the tuples and the context information. The application 610 running on the device 608 may send a UI update request to remote server 602, and the server 602 makes the data extraction using the necessary protocols (given the teachings herein, the skilled artisan, who will be familiar with appropriate protocols per se, will be able to select appropriate protocols to implement one or more embodiments), computes the new UI, and submits its parameters to the remote application 610.

Optionally, a ranking step can be carried out by a ranking engine prior to the step of sending the data to the remote device. However, in one or more embodiments, the platform only needs the final results (i.e., the ranks themselves) and not the ranking application itself. One or more embodiments employ an appropriate ranking algorithm to sort the elements appearing on the UI; other ranks can be directly from tables, for example.

The data that causes the display to be re-ordered can be sent periodically at predetermined times; when a change is detected in the context of the remote computing device (e.g., location, weather), when the CSM is first invoked on a device, and so on.

In some instances, an additional step includes obtaining, with the computer processor, access to an unsorted global tuple list of incident types. Each tuple of the unsorted global tuple list includes at least the incident identifier, the corresponding incident type, the corresponding context, and the corresponding impact factor. A further step includes sorting the unsorted global tuple list by decreasing order of the impact factor to obtain the sorted global tuple list. In one or more embodiments, the aspects discussed in this paragraph are implemented on the remote server 602, which includes at least a database and a network server (which can be implemented as a web server, for instance).

In some instances, the corresponding context for the tuples and the context information for the at least one remote computing device includes time, location, weather, and optionally user profile. In some cases, the location is obtained directly from the at least one remote computing device, but the weather for the at least one remote computing device is obtained indirectly from an external source. In one or more embodiments, the data mentioned in this paragraph are directly obtained by the client application 610 or the operating system of client device 608 through the device's sensors such as the GPS 708, thermometer, etc., and through the user's identification parameters that can be directly obtained by the application.

In one or more embodiments, the computer processor obtains a plurality of incident reports from a plurality of external computing devices 608; and the sorted global tuple is periodically updated list based on at least portions of the plurality of incident reports. In one or more embodiments, one piece of the application is responsible for receiving the reports. For example, the remote server 602 may provide a RESTful application program interface (API) in order to offer this functionality automatically.

It is worth repeating that the ranking of the report items, i.e., the changing of the order of the report items based on information about context and on the user's profile, is a significant aspect of one or more embodiments. A suitable software module implementing this functionality is typically deployed on the remote server 602, which has access to the required databases.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 6, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. For example, device 608 employs a module to implement the CSM 910, and also has an operating system. Server 602 will have a suitable operating system and a suitable server program such as a network server program (e.g., web server). Remote server 602 also includes one or more suitable databases with context information and tuple list 606, and runs CSP 604. One piece of the application 604; e.g., a sub-module, is responsible for receiving the reports (see above discussion of RESTful API). A ranking engine module can be employed in at least some embodiments. The method steps can then be carried out using the distinct software modules and/or sub-modules of the system, as described above, executing on one or more hardware processors 802 and/or 702. The modules can reside in memories 804, 712 as the case may be. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having computer readable program code embodied therewith, said computer readable program code comprising:
    computer readable program code configured to obtain access to a sorted global tuple list of incident types, each tuple of said global tuple list comprising at least an incident identifier, a corresponding incident type, a corresponding context, and a corresponding impact factor, said corresponding impact factor specifying importance of solving said corresponding incident type in said corresponding context, each tuple of said global tuple list being sorted by decreasing order of said impact factor, wherein solving comprises generating and transmitting an incident report to a remote server;
    computer readable program code configured to obtain context information for at least one remote computing device; and
    computer readable program code configured to, based on said context information for said at least one remote computing device and said sorted global tuple list, send, over a telecommunications infrastructure, data which causes said sorted global tuple list of incident types in an incident reporting display on said remote computing device to be re-ordered in accordance with said impact factors as they are ranked in accordance with said context information for said at least one remote computing device, wherein each incident type in said incident reporting display is selectable for generating and transmitting a corresponding incident report to said remote server.

2. The computer program product of claim 1, further comprising:
    computer readable program code configured to obtain access to an unsorted global tuple list of incident types, each tuple of said unsorted global tuple list comprising at least said incident identifier, said corresponding incident type, said corresponding context, and said corresponding impact factor; and
    computer readable program code configured to sort said unsorted global tuple list by decreasing order of said impact factor to obtain said sorted global tuple list.

3. The computer program product of claim 2, wherein:
    said corresponding context comprises a time corresponding to said incident identifier, a location corresponding to said incident identifier, and weather corresponding to said incident identifier;
    said context information for said at least one remote computing device comprises time, location, and weather; and
    said computer readable program code configured to obtain said location for said at least one remote computing device comprises computer readable program code configured to obtain said location directly from said at least one remote computing device.

4. The computer program product of claim 3, wherein said computer readable program code configured to obtain said weather of said context information for said at least one remote computing device comprises computer readable program code configured to obtain said weather of said context information for said at least one remote computing device indirectly from an external source.

5. The computer program product of claim 3, wherein said context information for said at least one remote computing device further comprises user profile.

6. The computer program product of claim 2, wherein said computer readable program code configured to obtain access to an unsorted global tuple list of incident types comprises computer readable program code configured to receive said unsorted global tuple list of incident types from said remote server via a telecommunications infrastructure, said remote server configured to store said unsorted global tuple list of incident types.

7. The computer program product of claim 2, wherein said computer readable program code configured to obtain access to an unsorted global tuple list of incident types comprises computer readable program code configured to receive said unsorted global tuple list of incident types from a citizen sensor platform running on said remote server via a telecommunications infrastructure, said remote server configured to store said unsorted global tuple list of incident types.

8. The computer program product of claim 1, further comprising:
    computer readable program code configured to obtain a plurality of incident reports from a plurality of external computing devices; and
    computer readable program code configured to periodically update said sorted global tuple list based on at least portions of said plurality of incident reports.

9. An apparatus comprising:
    a memory; and
    at least one processor, coupled to said memory, and operative to:
        obtain access to a sorted global tuple list of incident types, each tuple of said global tuple list comprising at least an incident identifier, a corresponding incident type, a corresponding context, and a corresponding impact factor, said corresponding impact factor specifying importance of solving said corresponding incident type in said corresponding context, each tuple of said global tuple list being sorted by decreasing order of said impact factor, wherein solving comprises generating and transmitting an incident report to a remote server;
        obtain context information for at least one remote computing device; and
        based on said context information for said at least one remote computing device and said sorted global tuple list, send, over a telecommunications infrastructure, data which causes said sorted global tuple list of incident types in an incident reporting display on said remote computing device to be re-ordered in accordance with said impact factors as they are ranked in accordance with said context information for said at least one remote computing device, wherein each incident type in said incident reporting display is selectable for generating and transmitting a corresponding incident report to said remote server.

10. The apparatus of claim 9, wherein said at least one processor is further operative to:
    obtain access to an unsorted global tuple list of incident types, each tuple of said unsorted global tuple list comprising at least said incident identifier, said corresponding incident type, said corresponding context, and said corresponding impact factor; and
    sort said unsorted global tuple list by decreasing order of said impact factor to obtain said sorted global tuple list.

11. The apparatus of claim 10, wherein:
said corresponding context comprises a time corresponding to said incident identifier, a location corresponding to said incident identifier, and weather corresponding to said incident identifier;
said context information for said at least one remote computing device comprises time, location, and weather; and
said at least one processor is operative to to obtain said location for said at least one remote computing device comprises by obtaining said location directly from said at least one remote computing device.

12. The apparatus of claim 11, wherein said at least one processor is operative to obtain said weather of said context information for said at least one remote computing device by obtaining said weather of said context information for said at least one remote computing device indirectly from an external source.

13. The apparatus of claim 11, wherein said context information for said at least one remote computing device further comprises user profile.

14. The apparatus of claim 10, wherein said at least one processor operative to obtain access to an unsorted global tuple list of incident types is further operative to receive said unsorted global tuple list of incident types from said remote server via a telecommunications infrastructure, said remote server operative to store said unsorted global tuple list of incident types.

15. The apparatus of claim 10, wherein said at least one processor operative to obtain access to an unsorted global tuple list of incident types is further operative to receive said unsorted global tuple list of incident types from a citizen sensor platform running on said remote server via a telecommunications infrastructure, said remote server operative to store said unsorted global tuple list of incident types.

16. The apparatus of claim 9, wherein said at least one processor is further operative to:
obtain a plurality of incident reports from a plurality of external computing devices; and
periodically update said sorted global tuple list based on at least portions of said plurality of incident reports.

* * * * *